United States Patent [19]

Falk et al.

[11] Patent Number: 4,542,179

[45] Date of Patent: Sep. 17, 1985

[54] ACRYLIC SEQUENTIAL GRAFT COPOLYMER-STYRENE-ACRYLONITRILE COPOLYMER BLENDS

[75] Inventors: John C. Falk, Northbrook; Leland B. Kliever, Naperville, both of Ill.

[73] Assignee: Borg-Warner Chemicals, Inc., Parkersburg, W. Va.

[21] Appl. No.: 653,631

[22] Filed: Sep. 24, 1984

[51] Int. Cl.$^4$ .................. C08K 3/20; C08L 25/12; C08L 51/00

[52] U.S. Cl. .................. 524/432; 524/430; 525/72; 525/74; 525/77; 525/78; 525/79; 525/80; 525/902

[58] Field of Search ............... 524/430, 432, 427, 436; 525/902, 72, 74, 77, 78, 79, 80

[56] References Cited

U.S. PATENT DOCUMENTS

| | | | |
|---|---|---|---|
| 3,851,014 | 11/1974 | Dalton | 525/72 |
| 3,922,320 | 11/1975 | Love | 525/72 |
| 4,371,663 | 2/1983 | Russell | 525/72 |
| 4,473,679 | 9/1984 | Falk et al. | 525/902 |

*Primary Examiner*—Allan M. Lieberman
*Attorney, Agent, or Firm*—Richard J. Schlott

[57] ABSTRACT

The addition of styrene-acrylonitrile copolymer to acrylic core-shell thermoplastic elastomers reduces mold shrinkage and improves surface hardness. The compositions are useful as moldable and extrudable rubber goods.

9 Claims, No Drawings

ACRYLIC SEQUENTIAL GRAFT COPOLYMER-STYRENE-ACRYLONITRILE COPOLYMER BLENDS

BACKGROUND OF THE INVENTION

This invention relates to thermoplastic compositions comprising blends of acrylic sequential graft copolymers and styrene-acrylonitrile copolymers having reduced mold shrinkage and increased surface hardness characteristics and to a method for improving the mold shrinkage and surface hardness of acrylic sequential graft copolymer thermoplastic elastomer.

The term "thermoplastic elastomer" has generally been applied to elastomers that can be readily processed and reprocessed by conventional melt processing equipment by virtue of the fact that such elastomers are not cured or vulcanized. The reprocessability of these elastomers compared with conventional cured or thermoset rubbers results in a great reduction in loss due to scrap, with consequent economic benefits for the processor. A variety of such materials have been introduced in recent years such as thermoplastic polyesters, styrene block copolymers, and thermoplastic olefin-rubber blends. Typical of such materials are the styrene-butadiene-styrene block copolymers sold as Kraton brand elastomers by the Shell Chemical Co. and the Hytrel brand polyester elastomers sold by DuPont. Many of these elastomers have found wide application in consumer goods such as in shoe soling formulations and the like, as well as in such industrial applications as wire coating, hose and tubing, electrical connectors and automotive parts.

High rubber content graft copolymers, by which is meant graft polymers prepared by graft-polymerizing rigid monomers in the presence of rubbery polymeric substrates and comprising greater than 50 wt% rubbery substrate polymer, are widely used as impact modifiers for thermoplastics such as styrene resins, styrene-acrylonitrile (SAN) resins, PVC resins and the like. Typical of such materials are graft copolymers of styrene and acrylonitrile and optionally methylmethacrylate on diene rubber substrates such as the Blendex brand modifiers sold by Borg-Warner Chemicals, Inc. and graft copolymers of methacrylates on acrylic rubber substrates and of methacrylates on diene rubber substrates sold as modifier resins by Rohm and Haas. A wide variety of such graft copolymers is readily available commercially. In general, rubbery graft copolymer impact modifiers are employed at levels of less than 30 wt% and often at less than 10 wt% in blends with rigid resins to provide high impact thermoplastics. Although often referred to as rubbery modifiers, these copolymers for the most part are not truly elastomeric and do not exhibit useful elastomeric properties without further modification and vulcanization. These materials therefore are not considered to be thermoplastic elastomers.

More recently, in U.S. patent application Ser. No. 560,360, filed Dec. 12, 1983, now U.S. Pat. No. 4,473,679 there were disclosed elastomeric compositions having a core-shell structure prepared by a sequential polymerization process, said compositions comprising (a) a rigid copolymer core formed of at least one rigid monovinylidene monomer and a copolymerizable functional monomer, (b) a rubbery copolymer outer layer formed of at least one rubbery acrylic monomer and a second copolymerizable functional monomer and (c) a transition layer, intermediate between the core and outer shell, formed of a copolymerized mixture of the core and shell components. These compositions are thermoplastic elastomers without being vulcanized or cured. Although quite useful for many applications, these compositions exhibit a fairly high degree of mold shrinkage, and may be somewhat soft for certain applications where surface hardness and stiffness are important. Formulations of these elastomers which exhibit reduced mold shrinkage and higher surface hardness would thus widen the potential end-uses for these resins.

SUMMARY OF THE INVENTION

Acrylic sequential graft copolymer thermoplastic elastomers, when blended with minor amounts of SAN resins, are useful as moldable and extrudable thermoplastics. The compositions do not require vulcanization, exhibit a rubbery feel and appearance, have improved mold shrinkage characteristics and surface hardness, and may be melt-processed in conventional molding and extrusion equipment.

DETAILED DESCRIPTION OF THE PREFERRED EMBODIMENTS

The acrylic sequential or core-shell elastomers useful in the practice of this invention comprise (a) a rigid copolymer core formed of at least one rigid monovinylidene monomer and a first copolymerizable functional monomer, said rigid copolymer having a glass transition temperature greater than 20° C., (b) a rubbery copolymer outer shell prepared in the presence of and at least partially encapsulating the preformed core copolymer, said shell formed of at least one rubbery acrylic monomer and a second copolymerizable functional monomer, said rubbery copolymer having a glass transition temperature of less than about 0° C., and (c) a transition layer intermediate between the core and outer shell formed of a mixture of the core and shell components. The copolymerizable functional monomers are monoethylenically-unsaturated monomers containing at least one reactive, non-vinylic functional radical, and the first and second copolymerizable monomers are selected to be interreactive through their respective functional radicals. These compositions are thermoplastic elastomers without being vulcanized or cured, thus remaining thermally reprocessable.

The rigid copolymers useful in forming the particulate core copolymer are copolymers of at least one rigid monovinylidene monomer and a first copolymerizable functional monomer. The term rigid is a misnomer when applied to monomers, and what is meant by the phrase rigid monovinylidene monomers are monomers that when polymerized will provide a rigid polymer having a glass transition temperature (Tg) greater than 20° C. and include vinyl aromatic monomers, acrylic monomers, and copolymerizable mixtures thereof. Examples of vinyl aromatic monomers are styrene, alpha methylstyrene, alkyl-substituted styrene monomers such as vinyl toluene and halogen-substituted styrene monomers such as chlorostyrene, bromostyrene, di- and tri-bromo styrene and the like, and illustrative of acrylic monomers are alkyl methacrylates including methyl methacrylate, butyl methacrylate, octyl methacrylate and the like, and the corresponding nitriles such as acrylonitrile, methacrylonitrile, haloacrylonitrile and the like. The core copolymer may further include a copolymerizable, nonrigid monovinylidene monomer such as for example an alkyl acrylate, a vinyl ether, a vinyl ester or the like in minor amounts insufficient to depress the Tg of the final rigid copolymer below 20° C.

The core copolymer further includes at least one copolymerizable functional monomer, defined as a monoethylenically unsaturated monomer containing at least one reactive, non-vinylic functional radical. The functional radical may be selected from the group consisting of epoxy radicals, carbonyl radicals such as carboxylic acid, carboxylic anhydride, carbonamide, N-substituted carbonamide, aldehyde, alkyl and aryl keto, and the like, hydroxyl radicals, thiol radicals, amino radicals, isocyanate radicals, alkoxyalkyl radicals, and the like. Examples of such functional monomers include glycidyl methacrylate, acrylic and methacrylic acids, maleic anhydride, maleimide, acrylamide, N-alkoxyalkyl acrylamides such as N-isobutoxymethyl acrylamide, N-hydroxymethyl acrylamide and the like, methyl vinyl ketone, acrolein, vinyl isocyanate, hydroxyalkyl acrylates such as 2-hydroxyethyl acrylate, 2-hydroxyethyl methacrylate and the like. Also included are mixtures of two or more such functional monomers.

The core copolymers may be varied over a wide composition range, however, for most purposes the copolymer will comprise from about 99.9 to about 95 wt% of at least one rigid monovinylic monomer and from about 0.1 to about 5 wt% of first copolymerizable functional monomer. The preferred core copolymers are copolymers of styrene, acrylonitrile and acrylic acid.

The rubbery copolymers useful as the shell copolymer are copolymers of at least one rubbery acrylic monomer and a second copolymerizable functional monomer. The term rubbery acrylic monomers is intended to mean monomers that when polymerized will provide a rubbery polymer having a Tg below about 0° C. Illustrative of rubbery acrylic monomers are the alkyl acrylates including ethyl acrylate, butyl acrylate, 2-ethylhexyl acrylate, and the like. The rubbery copolymer may further include any of the rigid monovinylidene monomers set forth above such as for example styrene, acrylonitrile, methyl methacrylate and the like in amounts insufficient to raise the Tg of the final rubbery copolymer above about 0° C., which amount will lie in the range of from 0 to 100 parts by weight of rigid monovinylidene monomer per 100 parts by weight of rubbery monomer.

The shell copolymer further includes a second copolymerizable functional monomer, defined as a monoethylenically unsaturated monomer containing at least one reactive functional radical. The second functional monomer may be any of those defined hereinabove as useful for the preparation of the core copolymer including mixtures containing two or more such functional monomers, with the proviso that the reactive functional radical of said second functional monomer must be capable of reacting with the reactive functional radical of the first functional monomer contained in the core copolymer. In that sense, the reactive functional monomer contained within the core copolymer and the reactive functional monomer contained within the shell copolymer are complementary or interreactive. The shell copolymer may optionally further include a minor amount of a copolymerizable di- or trivinyl monomer such as a glycol diacrylate, divinylbenzene, trialkylcyanurate or the like to provide further grafting sites, as is widely practiced in the art.

The shell copolymer may be varied over a wide composition range, however, for most purposes the copolymer will comprise from about 99.9 to about 95 wt% of at least one rubbery monomer and from about 0.1 to about 5 wt% of a second copolymerizable functional monomer. The preferred shell copolymers are copolymers of an alkyl acrylate and 2-hydroxyethyl methacrylate.

As was said, the transition layer will be a copolymer formed from a mixture of the rubbery shell copolymer components and the rigid core copolymer components. The thermoplastic elastomeric compositions may be varied widely in the proportion of rigid core copolymer component and rubbery shell copolymer component as well as in the proportion of each that will be incorporated into the transition layer. However, for most purposes the ratio of rigid copolymer component to rubbery shell copolymer component will lie in the range of from about 1:10 to about 1:1, i.e., the composition will be comprised of from about 10 to about 100 parts by weight of the rigid copolymer component per 100 parts by weight of the rubbery copolymer component. At ratios of less than about 1:10 the compositions will be low strength thermoplastic rubbery materials, while at ratios greater than about 1:1 the compositions tend to be too rigid and inelastic for most elastomer applications. It will be understood, however, that compositions having a ratio above or below this range may well have utility where good elastomeric properties are not important.

The proportion of rigid core, transition layer and rubbery shell in the final core-shell particle may also be varied over a wide range. However, in general the transition layer will comprise from about 20 to about 80 wt% of the total weight of the core-shell particle structure. At very low levels of transition layer, the resulting elastomer has low tensile properties and poor low temperature characteristics, while at very high proportions of transition layer, the elastomer loses rubbery character. While the proportion of transition layer will vary depending upon the ratio of rigid core copolymer to rubber shell copolymer employed, the preferred compositions will have from about 30 to about 70 wt% transition layer in the final core-shell particle structure.

The core-shell compositions are prepared by an emulsion process, and preferably by a sequential emulsion polymerization process in which as a first polymerization step the core copolymer is prepared in particulate form as a latex. The transition layer is then formed by adding the monomers of the core and shell copolymers to the latex simultaneously, and polymerizing under conditions designed to minimize the formation of new particles, thus surrounding and encapsulating or partially encapsulating the particles of rigid core copolymer with the mixed polymers forming the transition layer. Finally, the monomers of the shell copolymer component are added and polymerized to form the encapsulating outer shell.

The staged process is analogous to the seeded sequential emulsion processes long known and used in the art to prepare multi-layered or core-shell polymer particles comprising highly crosslinked rubber phases either surrounding or encapsulated by other cross-linked polymeric layers. Typical of such processes are those disclosed by Hwa, et al in U.S. Pat. No. 3,661,994 and by Minton, in U.S. Pat. No. 3,502,745. These sequential processes may be adapted to the preparation of the uncrosslinked and thermoplastic elastomeric compositions of this invention to provide the desired core-shell layered particles having a rigid core, a mixed transition layer and a rubbery outer shell.

Although the thermoplastic core-shell elastomer compositions will preferably be directly prepared from the monomers by a sequential emulsion polymerization process, alternatively the requisite reactive functionality may be introduced by a post-reaction. For example, a controlled partial hydrolysis of an acrylate ester polymer such as a methyl methacrylate-styrene copolymer may be employed to provide a rigid core copolymer having carboxylic acid radicals. Similarly, equivalent polymers could be obtained by hydrolysis of styrene-vinyl acetate or styrene-maleic anhydride copolymers to provide rigid core copolymers having pendant hydroxyl or carboxylic acid radicals. Oxidation and epoxidation of ethylenically-unsaturated polymers may also be employed to introduce reactive hydroxyl, carboxylic or epoxy functionality. Rigid core copolymers may also be prepared by other methods and converted to the emulsion form for subsequent use in grafting by processes well known in the art.

The thermoplastic core-shell compositions thus comprise a particulate core formed of rigid core copolymer components, an outer shell formed of rubbery shell copolymer components and a transition layer intermediate between the core and outer shell, formed of a mixture of the core copolymer components and the shell copolymer components. The rigid core copolymer, the transition layer copolymers and the rubbery shell copolymer are capable of forming further bonds in a reaction between their respective functional radicals. The relative proportion of functional monomer present in each phase and the ease with which they interreact will affect the degree of linking and in turn may affect the reprocessability of the compositions. The optimum or most favorable functional monomer content will depend in part upon the particular end use requirement for ready moldability and reprocessability and will necessarily be determined for each particular combination of interreactive or complementary functional monomers by experiment. Thus, although functional monomer levels as great as 20 wt% may in some combinations produce thermally processable compositions, where higher degrees of processability and reprocessability are required, functional monomer levels of less than 5 wt% will be preferred.

The linking reaction will preferably take place after preparation of the core-shell structure, such as for example under the conditions encountered during a conventional melt-compounding or thermal processing step, i.e. during extrusion, milling or molding of the thermoplastic elastomeric composition.

The styrene-acrylonitrile or SAN copolymer resins useful in the practice of this invention are copolymers of styrene and acrylonitrile comprising from 90 to 50 wt% styrene and correspondingly from 10 to 50 wt% of acrylonitrile. Methods for preparing SAN copolymer resins are well known, and SAN resins are widely available commercially in a variety of molding and extrusion grades.

The compositions of this invention comprise from 100 parts by weight of acrylic sequential graft copolymer and from 5 to 35 parts by weight of SAN resin. Although the addition of far greater amounts of SAN, at levels of 100–500 pbw and even greater, are possible, blends having levels greater than about 35 pbw are rigid and inflexible, and take on the characteristics of high modulus thermoplastics. The desired improvement in mold shrinkage and hardness characteristics which results by adding SAN resin occurs at levels well below about 35 pbw, and generally below about 20 pbw, hence the preferred compositions will comprise from about 5 to about 20 pbw SAN per 100 pbw graft copolymer. The compositions may be prepared by any of the conventional rubber compounding techniques including dry blending the components then melt processing in a compounding extruder or on a two-roll mill. Alternatively the components may be mixed in batch melt mixing equipment such as a Banbury mixer or the like. The compositions may then be further extruded or injection molded in conventional ram- or screw-injection molding machines to form extruded or molded goods.

The compositions of this invention may further include antioxidants, stabilizers, fillers, pigments, extenders, secondary plasticizers, flame retardants, dyes and the like as is commonly practiced in the rubber compounding art.

The practice of this invention may be better understood through consideration of the following examples, which are provided by way of illustration of the invention and not in limitation thereof.

Preparation of Acrylic Sequential Core-Shell Graft Copolymer

The preparation of the thermoplastic core-shell elastomer compositions will be better understood by consideration of the following example which is provided by way of illustration and not in limitation thereof.

EXAMPLE A

Preparation by Sequential Polymerization

The following reaction mixtures were prepared, degassed, and stored under nitrogen prior to polymerization:

| initiator solution | |
|---|---|
| Sodium peroxydisulfate | 6.0 g. |
| Water | 200 |
| rigid monomer emulsion | |
| Styrene | 349.6 g. |
| Acrylonitrile | 124.9 |
| Acrylic Acid | 13.0 |
| rubbery monomer emulsion | |
| Butyl acrylate | 786.5 g. |
| 2-hydroxyethyl methacrylate | 26.0 |
| Water | 656 |
| OT-100 | 15.6 |

A 5 l. polymerization reactor was charged with a mixture of 1350 g of water, 3.0 g of sodium carbonate and 1.4 g. of DS-4 (sodium dodecyl benzene sulfonate, 23% aqueous). The mixture was stirred under a nitrogen atmosphere and heated to 80° C., then 97.5 of the rigid monomer emulsion was added, followed by 100 ml of the initiator solution. After stirring at 250 rpm and 80° C. for 30 min., an additional 146.3 g. of the rigid monomer emulsion was added over a 10 min. period, and the stirred mixture was heated at 80° C. an additional 10 min., to complete the formulation of the particulate core copolymer latex. The remaining rigid copolymer mixture (243.7 g.), together with ½ the rubbery monomer emulsion were added simultaneously over a 60 min. period. The balance of the rubbery monomer emulsion was then added over an additional 60 min. period. The balance of the initiator mixture was added continually with the rubbery monomer emulsion. The temperature was maintained at 80° C. throughout the addition of the monomer emulsions and then raised to 85° C. for an additional 60 min. before the kettle was cooled to 65° C. A "chaser" mixture of 1 ml of 75% t-butyl peroxy pivalate, 5.2 ml of 5% sodium formaldehyde sulfoxylate and 5 ml of water may be added at this point to reduce the unreacted monomer levels.

The cooled latex was filtered, then coagulated by slowly stirring into 4 volumes of dilute aqueous aluminum sulfate. The solid polymer was then collected by centrifugation, washed with water and dried overnight at 40°–50° C. in a vacuum oven. The composition is a core-shell composition having 18.8% core of a rigid core copolymer of 97.3 wt% styrene and acrylonitrile as monovinylidene monomers and 2.7 wt% acrylic acid as the first functional monomer, and 30.2% of a rubbery shell copolymer of 96.8 wt% butyl acrylate as the rubbery monomer and 3.2 wt% of 2-hydroxyethyl methacrylate as the second functional monomer. The intermediate or transition layer comprises 50.3 wt% of the structure, and is a mixture of the styrene, acrylonitrile and acrylic acid rigid core monomer components and the butylacrylate and 2-hydroxyethyl methacrylate rubbery shell monomer components. The ratio of rigid copolymer components to rubbery copolymer components is 1:1.67, corresponding to 60 pbw rigid components per 100 pbw rubber components in the composition.

EXAMPLES B–E

A series of core-shell elastomers were prepared substantially by the process of Example A but with varying levels of monomer in the core, shell and transition layer. These formulations are summarizied in Table I.

TABLE I

| | Core-Shell Elastomers | | | | |
|---|---|---|---|---|---|
| Example | A | B | C | D | E |
| Rigid Monomers, pbw | 60 | 67.8 | 30 | 30 | 65 |
| S-AN, wt % | 97.3 | 97.5 | 93.5 | 98.4 | 96.2 |
| AA, wt % | 2.7 | 2.5 | 6.5 | 1.6 | 3.8 |
| Rubbery Monomers, pbw | 100 | 100 | 100 | 100 | 100 |
| BA, wt % | 96.8 | 95 | 96.1 | 97 | 95 |
| HEMA, wt % | 3.2 | 5 | 3.9 | 3 | 5 |
| Core, wt % | 18.8 | 20 | 13.9 | 30 | 19.7 |
| Transition, wt % | 50.3 | 50 | 40 | 30 | 50.0 |
| Shell, wt % | 30.2 | 30 | 46.1 | 40 | 30.3 |

In the Tables, in Examples A–E and 1–8, the following terms are employed:
S-AN=styrene-acrylonitrile copolymer
AA=acrylic acid monomer
BA=butylacrylate monomer
HEMA=2-hydroxyethyl methacrylate monomer
Tensile Str=tensile strength at room temperature, ASTM D638
E=elongation at break, ASTM D638
Hardness=shore hardness, ASTM D2240, A and D ranges
Flex Mod=Flexural Modulous at room temperature, ASTM D638
Mold Shrinkage=lineal shrinkage, measured on ASTM tensile bars as a % of mold size

EXAMPLES 1–8

Blends of Acrylic Sequential Graft Copolymer and SAN

In the following Examples 1–8, acrylic sequential core-shell elastomers having the compositions indicated in summary form in Table I were compounded with varying amounts of SAN copolymer resin to prepare the test specimens summarized in Table II. All compositions additionally contain from 0.1 to 0.5 pbw zinc oxide as a processing aid.

The compositions were prepared by compounding the formulations on a two-roll mill at 350° F., sheeting out the compositions and cooling to room temperature. The compositions were then cut into strips and injection molded on a 1.0 oz Battenfeld reciprocating screw machine, using barrel temperatures in the range 280°–300° F. and a mold temperature of 100° F. to form test specimens. The formulations and the physical properties are summarized in Table II.

TABLE II

| | Elastomer | | SAN Copolymer | Tensile Strength | E | Hardness, Shore | | Flex. Mod. | Mold Shrink. |
|---|---|---|---|---|---|---|---|---|---|
| Ex No | Ident. | pbw | pbw | psi | % | A | D | K psi | % |
| Control | B | 100 | 0 | 750 | 210 | 60 | — | — | 10.5 |
| 1 | B | 100 | 11 | 1420 | 80 | 75 | — | — | 4.7 |
| 2 | B | 100 | 25 | 1500 | 100 | — | 45 | 50 | 0.7 |
| Control | C | 100 | 0 | 240 | 160 | 55 | — | — | — |
| 3 | D | 100 | 13 | 730 | 82 | 80 | — | — | 1.8 |
| 4 | D | 100 | 19 | 940 | 75 | 82 | 32 | 13.4 | 1.0 |
| 5 | D | 100 | 27 | 1180 | 65 | 89 | 39 | 31.5 | 1.0 |
| 6 | D | 100 | 33 | 1560 | 45 | 94 | 46 | 44.6 | 1.0 |
| Control | E | 100 | 0 | 750 | 150 | 80 | — | — | 8.2 |
| 7 | E | 100 | 75 | 1280 | 80 | 88 | — | — | 1.4 |
| 8 | E | 100 | 15 | 2010 | 70 | — | 44 | — | 0.9 |

It will be apparent that the blend compositions of this invention, Examples 1–8, are relatively flexible materials having useful physical properties. The addition of SAN to elastomeric acrylic core-shell graft copolymers will be seen to increase tensile strength and hardness and markedly improve mold shrinkage characteristics of these thermoplastic elastomers, by comparing the properties of blend Examples 1 and 2, blend Examples 3–6 and blend Examples 7 and 8 with the corresponding Control Examples containing no SAN copolymer.

The invention will thus be seen to be thermoplastic compositions comprising from 5 to 35 pbw of SAN per hundred parts by weight of an acrylic core-shell graft copolymer thermoplastic elastomer. The acrylic core-shell graft copolymers are those set forth in U.S. patent application Ser. No. 560,360, filed Dec. 12, 1983, and comprise (a) a rigid copolymer core formed of at least one rigid monovinylidene monomer and a first copolymerizable functional monomer, said rigid copolymer having a glass transition temperature greater than 20° C., (b) a rubbery copolymer outer shell formed of at least one rubbery acrylic monomer and a second copolymerizable functional monomer, said rubbery copolymer having a glass transition temperature of less than about 0° C., and (c) a transition layer formed of a mixture of the core and shell monomer components. The shell copolymer (b) surrounds and partially encapsulates the core copolymer (a), and the transition layer is intermediate between the core and shell components.

The compositions of this invention are useful in producing molded and extruded rubber goods, and may be further compounded with pigments, processing aids, stabilizers, antioxidants, lubricants, fillers, plasticizers and the like as is commonly practiced in the rubber compounding art without departing from the scope of the invention.

The compositions of this invention, though herein illustrated by way of specific examples, is limited in scope solely by the appended claims.

We claim:

1. A thermoplastic composition comprising a blend of 100 parts by weight of an acrylic sequential graft copolymer and from 5 to 35 parts by weight of a copolymer comprising 90 to 50 wt% styrene and 10 to 50 wt% acrylonitrile, wherein said acrylic sequential graft copolymer has a core-shell structure and consists of:
   (a) from 10 to 100 parts by weight of a rigid monomer mixture comprising from 99.9 to 95 wt% of at least one rigid monovinylic monomer and from 0.1 to 5 wt% of a first copolymerizable functional monomer, and 100 parts by weight of a rubbery monomer mixture comprising from 99.9 to 95 wt% of at least one rubbery acrylic monomer and from 0.1 to 5 wt% of a second copolymerizable functional monomer interractive with said first functional monomer; and
   (b) said core-shell structure consists of from 10 to 40 wt% of a rigid polymeric core formed of said rigid monomer mixture, from 10 to 50 wt% of rubbery polymeric shell formed of said rubbery monomer mixture and at least partially encapsulating said rigid polymeric core, and from 20 to 80 wt% of a copolymeric transition layer intermediate between said core and said shell and formed of said rigid monomer mixture and said rubbery monomer mixture.

2. The composition of claim 1 wherein said rigid monovinylic monomer is selected from the group consisting of vinyl aromatic monomers, acrylic monomers and mixtures thereof.

3. The composition of claim 1 wherein said first and second copolymerizable functional monomers are monoethylenically unsaturated monomers containing at least one reactive functional radical, said radical selected from the group consisting of epoxy radicals, carbonyl radicals, hydroxyl radicals, thiol radicals, amino radicals, isocyanate radicals, and alkoxyalkyl radicals.

4. The composition of claim 1 wherein said first and second copolymerizable functional monomers are selected from the group consisting of acrylic acids, acrylamides, N-alkoxyalkyl acrylamides and hydroxyalkyl acrylates.

5. The composition of claim 1 wherein said rigid monovinylic monomer is selcted from the group consisting of styrene, alpha methylstyrene, acrylonitrile and mixtures thereof, said rubbery acrylic monomer is a $C_4$–$C_8$ alkyl acrylate, and said first and second copolymerizable functional monomers are selected from the group consisting of acrylic acids and hydroxyalkyl acrylates.

6. The composition of claim 1 further comprising from 0.1–1 wt% of a metal oxide.

7. The composition of claim 1 wherein the acrylic sequential graft copolymer having a core-shell structure consists of:
   (a) from 30 to 70 parts by weight of a rigid copolymer component comprising from 99.5 to 95 wt% of at least one rigid monovinylic monomer selected from the group consisting of styrene, alphamethyl styrene, acrylonitrile and mixtures thereof and from 0.5 to 5.0 wt% of acrylic acid, and
   (b) 100 parts by weight of a rubber copolymer component comprising from 98 to 96 wt% of a $C_4$–$C_8$ alkyl acrylate and from 2 to 4 wt% of hydroxyethyl methacrylate; wherein said core-shell structure consists of from 10 to 40 wt% rigid core, from 10 to 50 wt% rubbery shell and from 20 to 80 wt% of transition layer intermediate between said core and said shell, said transition layer consisting of a copolymer of said rigid monovinylic monomer, said acrylic acid, said $C_4$–$C_8$ alkyl acrylate and said hydroxyethyl methacrylate.

8. The composition of claim 7 wherein the $C_4$–$C_8$ alkyl acrylate is butyl acrylate.

9. The composition of claim 1 comprising from 5 to 20 parts by weight of said styrene-acrylonitrile copolymer and from 0.1 to 1 wt%, based on total thermoplastic composition, of zinc oxide.

* * * * *